United States Patent
Dai et al.

(10) Patent No.: US 12,508,635 B2
(45) Date of Patent: Dec. 30, 2025

(54) INTEGRATED SYSTEM FOR ANAEROBIC DIGESTION OF ORGANIC SOLID WASTE

(71) Applicant: TONGJI UNIVERSITY, Shanghai (CN)

(72) Inventors: Xiaohu Dai, Shanghai (CN); Qi Song, Shanghai (CN); Yu Hua, Shanghai (CN); Shuxian Chen, Shanghai (CN); Junwei Yang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 19/195,205

(22) Filed: Apr. 30, 2025

(65) Prior Publication Data
US 2025/0262655 A1   Aug. 21, 2025

(30) Foreign Application Priority Data
Aug. 9, 2024   (CN) .......................... 202411087611.4

(51) Int. Cl.
*B09B 3/65* (2022.01)
*B09B 3/70* (2022.01)

(52) U.S. Cl.
CPC . *B09B 3/65* (2022.01); *B09B 3/70* (2022.01)

(58) Field of Classification Search
None
See application file for complete search history.

(56) References Cited

U.S. PATENT DOCUMENTS

| | | | | |
|---|---|---|---|---|
| 2012/0132521 A1* | 5/2012 | Silver | ....................... | C02F 3/28 204/252 |
| 2013/0299400 A1* | 11/2013 | Silver | .................. | C02F 1/46109 210/150 |
| 2022/0135929 A1* | 5/2022 | Dai | .......................... | C12N 1/32 435/292.1 |

FOREIGN PATENT DOCUMENTS

| | | | | |
|---|---|---|---|---|
| CN | 204661664 | * | 9/2015 | |
| CN | 212356703 | U | 1/2021 | |
| CN | 113603317 | A | 11/2021 | |
| CN | 116177829 | A | 5/2023 | |
| CN | 116216924 | * | 6/2023 | |
| CN | 116216924 | A | 6/2023 | |
| KR | 20190063585 | A | 6/2019 | |
| KR | 20210040564 | * | 4/2021 | |
| WO | WO-2011011829 | A1 * | 2/2011 | ............. H01M 8/16 |

* cited by examiner

*Primary Examiner* — Michael A Marcheschi
*Assistant Examiner* — Nathan G Esperon

(57) ABSTRACT

An integrated system for anaerobic digestion of organic solid waste, including a continuous stirred-tank reactor, a micro-voltage- and conductive material-enhanced reactor, and a micro-aeration and inert solid waste separation integrated reactor. The micro-electrolysis reactor includes a plate cover, a cylindrical tank body and two column bases. The plate cover is provided with a direct-current (DC) regulated power supply to apply a micro voltage. The cylindrical tank body is provided with a carbon fiber felt and a graphite rod as electrodes, on which electroactive anaerobic bacteria are distributed. Multiple iron-carbon layers are arranged in the tank body to optimize the interspecies electron transfer.

8 Claims, 2 Drawing Sheets

INTEGRATED SYSTEM FOR ANAEROBIC DIGESTION OF ORGANIC SOLID WASTE

CROSS-REFERENCE TO RELATED APPLICATIONS

This application claims the benefit of priority from Chinese Patent Application No. 202411087611.4, filed on Aug. 9, 2024. The content of the aforementioned application, including any intervening amendments made thereto, is incorporated herein by reference in its entirety.

TECHNICAL FIELD

This application relates to anaerobic digestion of organic waste, and more particularly to an integrated system for anaerobic digestion of organic solid waste.

BACKGROUND

Organic solid waste (such as livestock and poultry manure, kitchen waste and excess sludge) has the characteristics of large output, high organic component content, and complex and diverse composition. Improper treatment of the organic solid waste will lead to the decomposition of organic matters, which will further damage the ecological environment and lead to the growth of pathogenic microorganisms, thereby threatening the human health.

Anaerobic digestion is an environmentally-friendly biological treatment strategy for perishable organic solid waste, which is conducted by anaerobic microorganisms to convert organic matters into energy sources (e.g., methane), so as to achieve the reduction and recycling of organic solid waste. Continuous stirred-tank reactors have been extensively used as the main reaction carrier for anaerobic digestion in the practical engineering application, but they struggle with a poor resource conversion efficiency under an anaerobic condition. For such reactors, the reported highest organic loading rate is only 10 kg/m$^3$·d, which is significantly lower than the organic loading rate (100 kg/m$^3$·d) of the naturally-occurring reactor (i.e., the rumen of ruminants).

Anaerobic digestion is a complex chain reaction, including four stages: hydrolysis, acidogenesis, acetogenesis and methanogenesis. Moreover, the anaerobic digestion system involves cooperation and coexistence of multiple species of microorganisms. Therefore, the composition and activity of the anaerobic microbial flora are crucial for the anaerobic digestion efficiency of organic solid waste. It has been disclosed in the latest researches that applying a micro voltage to the digestion system can structurally loosen the solid waste and significantly improve the activities of proteases and α-glucosidases. Moreover, it has also been demonstrated that introducing a conductive material can adjust the electron flow of biological metabolic reactions, and promote direct interspecies electron transfer among microorganisms. Adding a limited amount of oxygen (micro-aeration) can serve as an electron donor/acceptor to regulate the redox reactions and metabolic pathways of microorganisms and promote anaerobic biological conversion. However, due to the technical limitation and the lack of engineering application scenarios, the relevant research results have not been integrated into the practical engineering application yet.

Therefore, providing application scenarios for the above technologies and developing new anaerobic digestion systems suitable for the engineering applications are of great practical significance for improving the anaerobic digestion efficiency and resource conversion rate of organic solid waste.

SUMMARY

In view of the above problems in the prior art, the disclosure provides an integrated system for anaerobic digestion of organic solid waste.

Technical solutions of the present disclosure are described as follows.

In a first aspect, this application provides an integrated system for anaerobic digestion of organic solid waste, comprising:
- a continuous stirred-tank reactor;
- a micro-voltage- and conductive material-enhanced reactor; and
- a micro-aeration and inert solid waste separation integrated reactor;
- wherein the continuous stirred-tank reactor comprises a first feeding port, a first thermal insulation layer, a heating rod, a biogas outlet, a stirring paddle, a first discharge port and a second feeding port;
- the micro-voltage- and conductive material-enhanced reactor is composed of a hemispherical plate cover, a cylindrical insulating tank body and two column bases;
- an outer side of the hemispherical plate cover is provided with a second discharge port, a pressure transmitter, a pH detection port, a direct-current (DC) regulated power supply, a wire sealing port, a first oxidation-reduction potential (ORP) detection port and a hanging ring; and the hemispherical plate cover is sealedly connected to the cylindrical insulating tank body via a flange;
- the cylindrical insulating tank body is sequentially provided with a second thermal insulation layer, an insulator, a carbon fiber felt and a built-in bracket from outside to inside; and the carbon fiber felt is connected to the DC regulated power supply through a first insulatively-sheathed wire;
- an interior of the cylindrical insulating tank body is sequentially provided with a feed-upflow zone, an iron-carbon material-loaded slot group, a micro-voltage reaction zone group and a pressurized discharge zone from bottom to top; a graphite rod is provided at a center of the interior of the cylindrical insulating tank body; a drain pipe is provided in the feed-upflow zone; the iron-carbon material-loaded slot group comprises six cylindrical mesh frames identical to each other for storing an iron-carbon material; the cylindrical insulating tank body is equally divided into seven portions by the six cylindrical mesh frames; each of the six cylindrical mesh frames is fixed to the cylindrical insulating tank body through the built-in bracket, and is in snap-fit with the graphite rod through an insulating sleeve; the micro-voltage reaction zone group comprises six micro-voltage reaction zones identical to each other; and the pressurized discharge zone is provided with a grid for separation from the six micro-voltage reaction zones, and an end of the graphite rod located in the pressurized discharge zone is connected to the DC regulated power supply through a second insulatively-sheathed wire;
- an outer side of the cylindrical insulating tank body is provided with a third feeding port, an inspection port group and a temperature transmitter; the third feeding port is arranged at a bottom of the cylindrical insulating tank body, and a bottom tangent of the third feeding port is coincident with an extension line of a top tangent of the drain pipe; the inspection port group comprises six inspection ports, and the six inspection ports are respectively arranged outside the six micro-voltage reaction zones; a bottom tangent of each of the six inspection ports is coincident with an extension line of a top tangent of a corresponding one of the six cylindrical mesh frames;

the micro-aeration and inert solid waste separation integrated reactor comprises a fourth feeding port, a fifth feeding port, a sixth feeding port, an air pump connection port, a third discharge port, a second ORP detection port, a third thermal insulation layer and a fourth discharge port; and the first discharge port is in pipeline connection with the third feeding port; the second discharge port is in pipeline connection with the fourth feeding port, the fifth feeding port and the sixth feeding port; and the third discharge port is in pipeline connection with the second feeding port.

In some embodiments, the integrated system further comprises:

a first screw pump; and a second screw pump;

wherein the first screw pump is in pipeline connection with the first feeding port, and the second screw pump is in pipeline connection with the third feeding port and the first discharge port.

In some embodiments, the integrated system further comprises:

a backup pipeline;

wherein the backup pipeline is configured to communicate the second screw pump with the fourth feeding port, the fifth feeding port and the sixth feeding port.

In some embodiments, a height of each of the six cylindrical mesh frames is 1/50 of a height of the cylindrical insulating tank body.

In some embodiments, an average pore diameter of each of the six cylindrical mesh frames is 8 mm, and two layers of iron-carbon balls with an average diameter of 10 mm serve as the iron-carbon material, and are laid in each of the six cylindrical mesh frames.

In some embodiments, the carbon fiber felt has a thickness of 10 mm, and is pre-processed by acid washing before being laid to remove some of functional groups on the surface; and the acid washing is performed through steps of:

successively soaking the carbon fiber felt in tap water for 2 h, in a 1 mol/L hydrochloric acid solution for 6 h and in a 1 mol/L nitric acid solution for 6 h; and rinsing the carbon fiber felt with water to be neutral followed by air-drying.

In some embodiments, each of the six inspection ports is in a cylindrical shape, and has a height-to-diameter ratio of 1:10.

In some embodiments, the fourth feeding port is arranged at ¾ of a height of a body of the micro-aeration and inert solid waste separation integrated reactor, the fifth feeding port is arranged at ½ of the height of the body of the micro-aeration and inert solid waste separation integrated reactor, and the sixth feeding port is arranged at ¼ of the height of the body of the micro-aeration and inert solid waste separation integrated reactor.

In some embodiments, the micro-aeration and inert solid waste separation integrated reactor is connected to an air pump.

In some embodiments, the cylindrical insulating tank body has a height-to-diameter ratio of 5:1.

In some embodiments, the micro-aeration and inert solid waste separation integrated reactor has a cylindrical tank body with a height-to-diameter ratio of 5:1.

In some embodiments, a volume ratio of the continuous stirred-tank reactor to the micro-voltage- and conductive material-enhanced reactor is 25:1.

In some embodiments, a volume ratio of the continuous stirred-tank reactor to the micro-aeration and inert solid waste separation integrated reactor is 25:1.

In a second aspect, this application provides a method for anaerobic digestion of organic solid waste, comprising:

(1) placing the organic solid waste in a continuous stirred-tank reactor for stirring to obtain an intermediate I;

(2) placing the intermediate I in a micro-voltage- and conductive material-enhanced reactor for enrichment and loading of anaerobic digestion bacteria to obtain an intermediate II;

(3) placing the intermediate II in a micro-aeration and inert solid waste separation integrated reactor for anaerobic bacterial activity enhancement to obtain an intermediate III; and (4) returning the intermediate III to the continuous stirred-tank reactor to achieve a closed loop system; and performing quantitative discharge through the micro-aeration and inert solid waste separation integrated reactor according to a hydraulic retention time;

wherein the above integrated system comprises the continuous stirred-tank reactor, the micro-voltage- and conductive material-enhanced reactor, and the micro-aeration and inert solid waste separation integrated reactor.

In some embodiments, in step (2), a power supply voltage of the micro-voltage- and conductive material-enhanced reactor is adjusted to 0.6 V.

In some embodiments, in step (3), a value range of the second ORP detection port is −400 to −450 mV.

Compared to the prior art, the present disclosure has the following beneficial effects.

(1) In the system provided herein, a micro voltage is applied to an anaerobic digestion system by the DC regulated power supply to promote anaerobic digestion of the organic solid waste; electroactive anaerobic bacteria are enriched on surfaces of the graphite rod electrode and carbon fiber felt electrode; multiple iron-carbon layers are arranged in the reaction tank body to optimize the interspecies electron transfer process of microorganisms in the anaerobic digestion system, and enrich electroactive anaerobic bacteria on the surface of the iron-carbon materials; and a limited amount of oxygen (micro-aeration) is added as an electron donor/acceptor to regulate the redox reaction and metabolic pathway of microorganisms, and promote the anaerobic bioconversion. In addition, the reactor is externally connected to an anaerobic digestion reactor, and the anaerobic digestion microbial flora structure of the entire reaction system is gradually optimized through circulation, thereby ultimately improving the anaerobic resource conversion efficiency of the organic solid waste.

(2) In the present disclosure, in the process of anaerobic digestion of the organic solid waste in the integrated system, the cutting-edge technologies of anaerobic biological treatment of organic solid waste, i.e., micro voltage, micro electrolysis and micro aeration, are highly integrated. The traditional non-selective discharge method is replaced by a discharge method that relies on cyclone separation in an external reactor. In the micro-voltage- and conductive material-enhanced reactor, the graphite rod with high conductivity is used as a positive electrode of the power supply, and the carbon fiber felt with high specific surface area and excellent conductivity is used as a negative electrode of the power supply. The digestion reaction is enhanced by micro voltage, and the electroactive microorganisms are loaded on the electrode surface. In the micro-aeration and inert solid waste separation integrated reactor, a redox potential in the tank is adjusted by micro-oxygen supply to further activate the anaerobic digestion flora. The microbial flora structure and reaction activity in the continuous stirred-tank reactor are gradually optimized through continuous external circulation, thereby improving the anaerobic digestion efficiency of the and the resource conversion efficiency of the organic solid waste.

Figure 1:
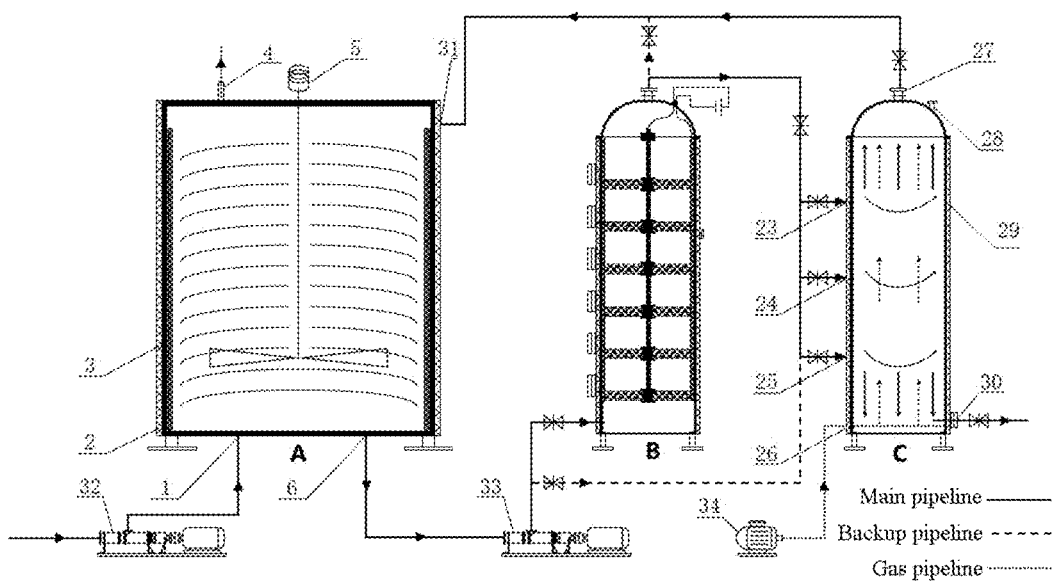
FIG. 1 is a structural diagram of an integrated system for anaerobic digestion of organic solid waste in accordance with an embodiment of the present disclosure.

In the drawings: 1. first feeding port; 2. first thermal insulation layer; 3. heating rod; 4. biogas outlet; 5. stirring paddle; 6. first discharge port; 7. second discharge port; 8. pressure transmitter; 9. pH detection port; 10. direct-current (DC) regulated power supply; 11. wire sealing port; 12. first oxidation-reduction potential (ORP) detection port; 13. hanging ring; 14. second thermal insulation layer; 15. insulator; 16. carbon fiber felt; 17. built-in bracket; 18. graphite rod; 19. drain pipe; 20. grid; 21. third feeding port; 22. temperature transmitter; 23. fourth feeding port; 24. fifth feeding port; 25. sixth feeding port; 26. air pump connection port; 27. third discharge port; 28. second ORP detection port; 29. third thermal insulation layer; 30. fourth discharge port; 31. second feeding port; 32. first screw pump; 33. second screw pump; and 34. air pump.

DETAILED DESCRIPTION OF EMBODIMENTS

Ranges and any values disclosed herein are not limited to the exact ranges or values, and these ranges or values should be understood to include values close to these ranges or values. For numerical ranges, endpoint values of each range, endpoint values and individual point values of each range, and the individual point values can be combined with each other to obtain one or more new numerical ranges, and these numerical ranges should be regarded as specifically disclosed herein.

The present disclosure will be described in detail below with reference to the embodiments. In the following embodiments, unless otherwise specified, the raw materials used are all commercially available products.

In the following embodiments, unless otherwise specified, in the micro-voltage- and conductive material-enhanced reactor B, iron-carbon balls with a total amount of 100 g/L and an average diameter of 10 mm are evenly placed into six cylindrical mesh frames II through six inspection ports V.

In the following embodiments, unless otherwise specified, in the micro-aeration and inert solid waste separation integrated reactor C, the aeration volume and aeration duration are adjusted according to numerical feedback from the second oxidation-reduction potential (ORP) detection port 28.

Embodiment

Provided herein was a method for anaerobic digestion of organic solid waste, which was performed in an integrated system (including a continuous stirred-tank reactor A, a micro-voltage- and conductive material-enhanced reactor B and a micro-aeration and inert solid waste separation integrated reactor C) shown in FIG. 1. The method included the following steps.

Step (1) The organic solid waste was pumped by a first screw pump 32 to enter the continuous stirred-tank reactor A through a first feeding port 1, and stirred at 37° C. and 30 rpm to obtain an intermediate I.

The continuous stirred-tank reactor A includes the first feeding port 1, a first thermal insulation layer 2, a heating rod 3, a biogas outlet 4, a stirring paddle 5, a first discharge port 6, and a second feeding port 31.

Step (2) The intermediate I was pumped from the first discharge port 6 to a third feeding port 21 by a second screw pump 33 to enter the micro-voltage- and conductive material-enhanced reactor B for enrichment and loading of anaerobic digestion bacteria to obtain an intermediate II. A voltage of a direct-current (DC) regulated power supply 10 of the micro-voltage- and conductive material-enhanced reactor B was adjusted to 0.6 V.

Figure 2:
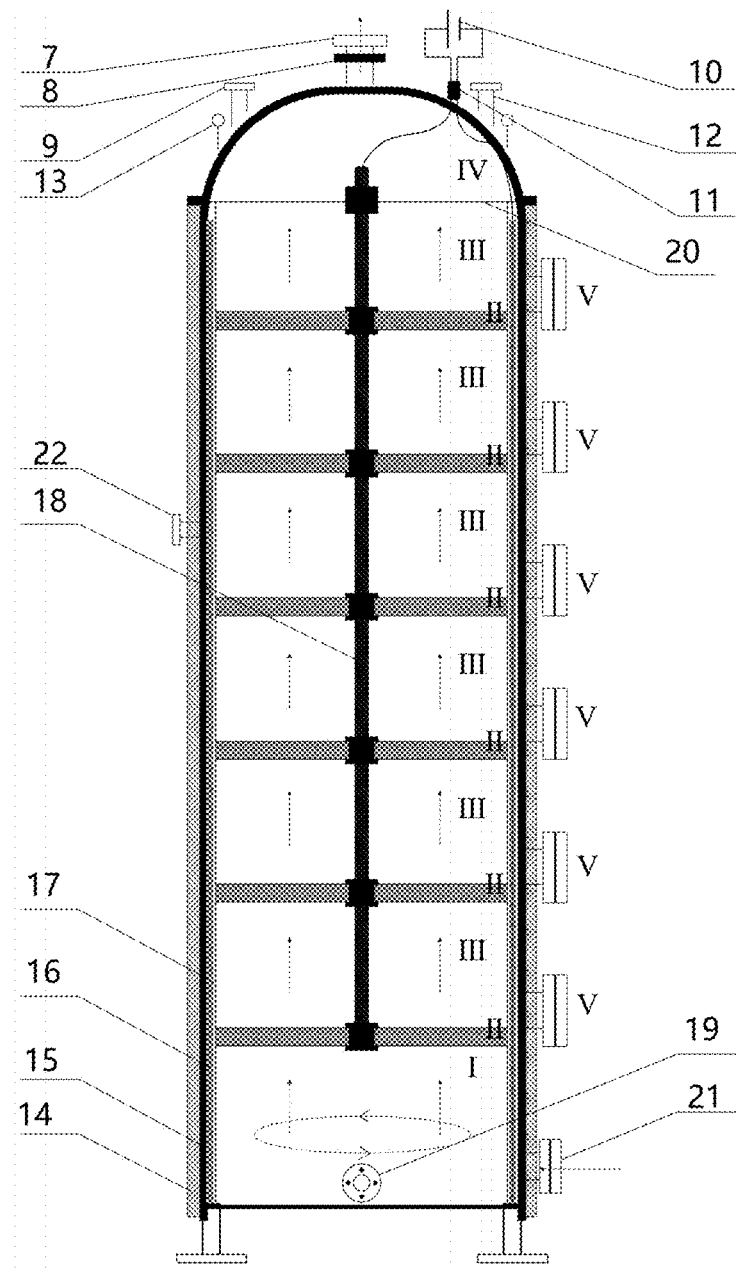
FIG. 2 is a structural diagram of a micro-voltage- and conductive material-enhanced reactor in accordance with an embodiment of the present disclosure.

As shown in FIG. 2, the micro-voltage- and conductive material-enhanced reactor B is composed of a hemispherical plate cover, a cylindrical insulating tank body and two column bases.

An outer side of the hemispherical plate cover is provided with a second discharge port 7, a pressure transmitter 8, a pH detection port 9, the DC regulated power supply 10, a wire sealing port 11, a first ORP detection port 12 and a hanging ring 13. The hemispherical plate cover is sealedly connected to the cylindrical insulating tank body via a flange.

The cylindrical insulating tank body is sequentially provided with a second thermal insulation layer 14, an insulator 15, a carbon fiber felt 16 and a built-in bracket 17 from outside to inside. The carbon fiber felt 16 is connected to the DC regulated power supply 10 through a first insulatively-sheathed wire.

An interior of the cylindrical insulating tank body is sequentially provided with a feed-upflow zone I, an iron-carbon material-loaded slot group, a micro-voltage reaction zone group and a pressurized discharge zone IV from bottom to top. A graphite rod 18 is provided at a center of the interior of the cylindrical insulating tank body. A drain pipe 19 is provided in the feed-upflow zone I. The iron-carbon material-loaded slot group includes six cylindrical mesh frames II identical to each other for storing an iron-carbon material. The cylindrical insulating tank body is equally divided into seven portions by the six cylindrical mesh frames II. Each of the six cylindrical mesh frames II is fixed to the cylindrical insulating tank body through the built-in bracket 17, and is in snap-fit with the graphite rod 18 through an insulating sleeve. The micro-voltage reaction zone group includes six micro-voltage reaction zones III identical to each other. The pressurized discharge zone IV is provided with a grid for separation from the six micro-voltage reaction zones III. An end of the graphite rod 18 located in the pressurized discharge zone IV is connected to the DC regulated power supply 10 through a second insulatively-sheathed wire.

An outer side of the cylindrical insulating tank body is provided with a third feeding port 21, an inspection port group and a temperature transmitter 22. The third feeding port 21 is arranged at a bottom of the cylindrical insulating tank body. A bottom tangent of the third feeding port 21 is coincident with an extension line of a top tangent of the drain pipe 19. The inspection port group includes six inspection ports V. The six inspection ports V are respectively arranged outside the six micro-voltage reaction zones III. A bottom tangent of each of the six inspection ports V is coincident with an extension line of a top tangent of a corresponding one of the six cylindrical mesh frames II.

Step (3) The intermediate II overflowed from the second discharge port 7 to a fourth feeding port 23, a fifth feeding port 24 or a sixth feeding port 25 (selected according to an inorganic component content of the feed material and an inorganic component content in the discharge from the fourth discharge port 30), and entered the micro-aeration and inert solid waste separation integrated reactor C for anaerobic bacteria activity enhancement to obtain an intermediate III. An oxidation-reduction potential value range of the second ORP detection port 28 was −400 to −450 mV.

The micro-aeration and inert solid waste separation integrated reactor C includes the fourth feeding port 23, the fifth feeding port 24, the sixth feeding port 25, an air pump connection port 26, a third discharge port 27, a second ORP detection port 28, a third thermal insulation layer 29 and the fourth discharge port 30.

Step (4) The intermediate III overflowed from the third discharge port 27 to the second feeding port 31 and returned to the continuous stirred-tank reactor A to achieve a closed loop system.

According to a hydraulic retention time in the integrated system, quantitative discharge was performed through the fourth discharge port 30.

Disclosed above are further detailed descriptions of this disclosure in combination with specific embodiments, which are not intended to limit the disclosure. For those of ordinary skill in the art to which the present disclosure belongs, any modifications, changes and replacements made without departing from the spirit of the disclosure shall fall within the scope of the disclosure defined by the appended claims.

What is claimed is:

1. An integrated system for anaerobic digestion of organic solid waste, comprising:
   a continuous stirred-tank reactor;
   a micro-voltage-and conductive material-enhanced reactor; and
   a micro-aeration and inert solid waste separation integrated reactor;
   wherein the continuous stirred-tank reactor comprises a first feeding port, a first thermal insulation layer, a heating rod, a biogas outlet, a stirring paddle, a first discharge port and a second feeding port;
   the micro-voltage-and conductive material-enhanced reactor is composed of a hemispherical plate cover, a cylindrical insulating tank body and two column bases;
   an outer side of the hemispherical plate cover is provided with a second discharge port, a pressure transmitter, a pH detection port, a direct-current (DC) regulated power supply, a wire sealing port, a first oxidation-reduction potential (ORP) detection port and a hanging ring; and the hemispherical plate cover is sealedly connected to the cylindrical insulating tank body via a flange;
   the cylindrical insulating tank body is sequentially provided with a second thermal insulation layer, an insulator, a carbon fiber felt and a built-in bracket from outside to inside; and the carbon fiber felt is connected to the DC regulated power supply through a first insulatively-sheathed wire;
   an interior of the cylindrical insulating tank body is sequentially provided with a feed-upflow zone, an iron-carbon material-loaded slot group, a micro-voltage reaction zone group and a pressurized discharge zone from bottom to top; a graphite rod is provided at a center of the interior of the cylindrical insulating tank body; a drain pipe is provided in the feed-upflow zone; the iron-carbon material-loaded slot group comprises six cylindrical mesh frames identical to each other for storing an iron-carbon material; the cylindrical insulating tank body is equally divided into seven portions by the six cylindrical mesh frames; each of the six cylindrical mesh frames is fixed to the cylindrical insulating tank body through the built-in bracket, and is in snap-fit with the graphite rod through an insulating sleeve; the micro-voltage reaction zone group comprises six micro-voltage reaction zones identical to each other; and the pressurized discharge zone is provided with a grid for separation from the six micro-voltage reaction zones, and an end of the graphite rod located in the pressurized discharge zone is connected to the DC regulated power supply through a second insulatively-sheathed wire;
   an outer side of the cylindrical insulating tank body is provided with a third feeding port, an inspection port group and a temperature transmitter; the third feeding port is arranged at the bottom of the cylindrical insulating tank body, and a bottom tangent of the third feeding port is coincident with an extension line of a top tangent of the drain pipe; the inspection port group comprises six inspection ports, and the six inspection ports are respectively arranged outside the six micro-voltage reaction zones; a bottom tangent of each of the six inspection ports is coincident with an extension line of a top tangent of a corresponding one of the six cylindrical mesh frames;
   the micro-aeration and inert solid waste separation integrated reactor comprises a fourth feeding port, a fifth feeding port, a sixth feeding port, an air pump connection port, a third discharge port, a second ORP detection port, a third thermal insulation layer and a fourth discharge port; and
   the first discharge port is connected with the third feeding port; the second discharge port is connected with the fourth feeding port, the fifth feeding port and the sixth feeding port; and the third discharge port is connected with the second feeding port.

2. The integrated system of claim 1, wherein the integrated system further comprises a first screw pump and a second screw pump; the first screw pump is connected with the first feeding port; and the second screw pump is connected with the third feeding port and the first discharge port; and/or
   the integrated system further comprises a backup pipeline; and the backup pipeline is configured to communicate the second screw pump with the fourth feeding port, the fifth feeding port and the sixth feeding port.

3. The integrated system of claim 1, wherein a height of each of the six cylindrical mesh frames is 1/50 of a height of the cylindrical insulating tank body; and/or
   an average pore diameter of each of the six cylindrical mesh frames is 8 mm, and two layers of iron-carbon balls with an average diameter of 10 mm are laid in each of the six cylindrical mesh frames.

4. The integrated system of claim 1, wherein the carbon fiber felt has a thickness of 10 mm, and is pre-processed by acid washing before being laid; and the acid washing is performed through steps of:
successively soaking the carbon fiber felt in tap water for 2 h, in a 1 mol/L hydrochloric acid solution for 6 h and in a 1 mol/L nitric acid solution for 6 h; and rinsing the carbon fiber felt with water to be neutral followed by air-drying.

5. The integrated system of claim 1, wherein each of the six inspection ports is in a cylindrical shape, and has a height-to-diameter ratio of 1:10.

6. The integrated system of claim 1, wherein the fourth feeding port is arranged at ¾ of a height of a body of the micro-aeration and inert solid waste separation integrated reactor, the fifth feeding port is arranged at ½ of the height of the body of the micro-aeration and inert solid waste separation integrated reactor, and the sixth feeding port is arranged at ¼ of the height of the body of the micro-aeration and inert solid waste separation integrated reactor; and/or
the micro-aeration and inert solid waste separation integrated reactor is connected to an air pump.

7. The integrated system of claim 1, wherein the cylindrical insulating tank body has a height-to-diameter ratio of 5:1; and/or
the micro-aeration and inert solid waste separation integrated reactor has a cylindrical tank body with a height-to-diameter ratio of 5:1.

8. The integrated system of claim 1, wherein a volume ratio of the continuous stirred-tank reactor to the micro-voltage-and conductive material-enhanced reactor is 25:1; and/or
a volume ratio of the continuous stirred-tank reactor to the micro-aeration and inert solid waste separation integrated reactor is 25:1.

* * * * *